US006690295B1

(12) United States Patent
De Boer

(10) Patent No.: US 6,690,295 B1
(45) Date of Patent: Feb. 10, 2004

(54) SYSTEM FOR DETERMINING THE POSITION OF VEHICLES AT AN AIRPORT

(75) Inventor: Robertus Gerardus De Boer, Heiloo (NL)

(73) Assignee: De Boer Development B.V., Heiloo (NL)

( * ) Notice: Subject to any disclaimer, the term of this patent is extended or adjusted under 35 U.S.C. 154(b) by 0 days.

(21) Appl. No.: 10/048,162

(22) PCT Filed: Jul. 26, 2000

(86) PCT No.: PCT/NL00/00529

§ 371 (c)(1), (2), (4) Date: Jan. 29, 2002

(87) PCT Pub. No.: WO01/08122

PCT Pub. Date: Feb. 1, 2001

(30) Foreign Application Priority Data

Jul. 26, 1999 (NL) ............................................ 1012711
Nov. 11, 1999 (NL) ............................................ 1013556

(51) Int. Cl.[7] ............................ B64F 1/20; G08G 5/00

(52) U.S. Cl. ....................... 340/951; 340/988; 340/989; 340/952; 340/933; 340/958

(58) Field of Search ................................ 340/945, 948, 340/951, 988, 989, 995.28, 947, 952, 954, 957, 933, 958, 977, 961; 342/29, 970

(56) References Cited

U.S. PATENT DOCUMENTS 3,971,025 A * 7/1976 Levine ................... 343/108 R
4,302,827 A * 11/1981 Rosenblum ................. 367/116
5,375,058 A * 12/1994 Bass .......................... 701/301
5,426,429 A * 6/1995 Norman et al. ............. 340/953
6,246,342 B1 * 6/2001 Vandevoorde et al. ...... 340/961
6,381,541 B1 * 4/2002 Sadler ........................ 701/301
6,411,890 B1 * 6/2002 Zimmerman ................ 701/120
6,462,697 B1 * 10/2002 Klamer et al. ................ 342/36

FOREIGN PATENT DOCUMENTS

EP 0 613 111 8/1994
EP 0 744 630 11/1996

* cited by examiner

*Primary Examiner*—Toan N Pham
(74) *Attorney, Agent, or Firm*—Young & Thompson

(57) ABSTRACT

Device for determining the position of an aircraft (11) at an airport, includes a plurality of sensors (5) for detecting at least one radio signal originating from a vehicle (11), in which the plurality of sensors (5) are preferably positioned at regular intervals from one another on parts (2, 3) of the airport which are accessible to the vehicle (11). The present device is preferably used for detecting the position of an aircraft (11) on the runway system of an airport. The sensors (5) are preferably fitted in light positions of runway lighting provided at the airport on taxiways, take-off and landing runways (2, 3) and on plat-forms. The signal originating from a radio altimeter (12) of an aircraft (11) is preferably used as the radio signal.

20 Claims, 1 Drawing Sheet

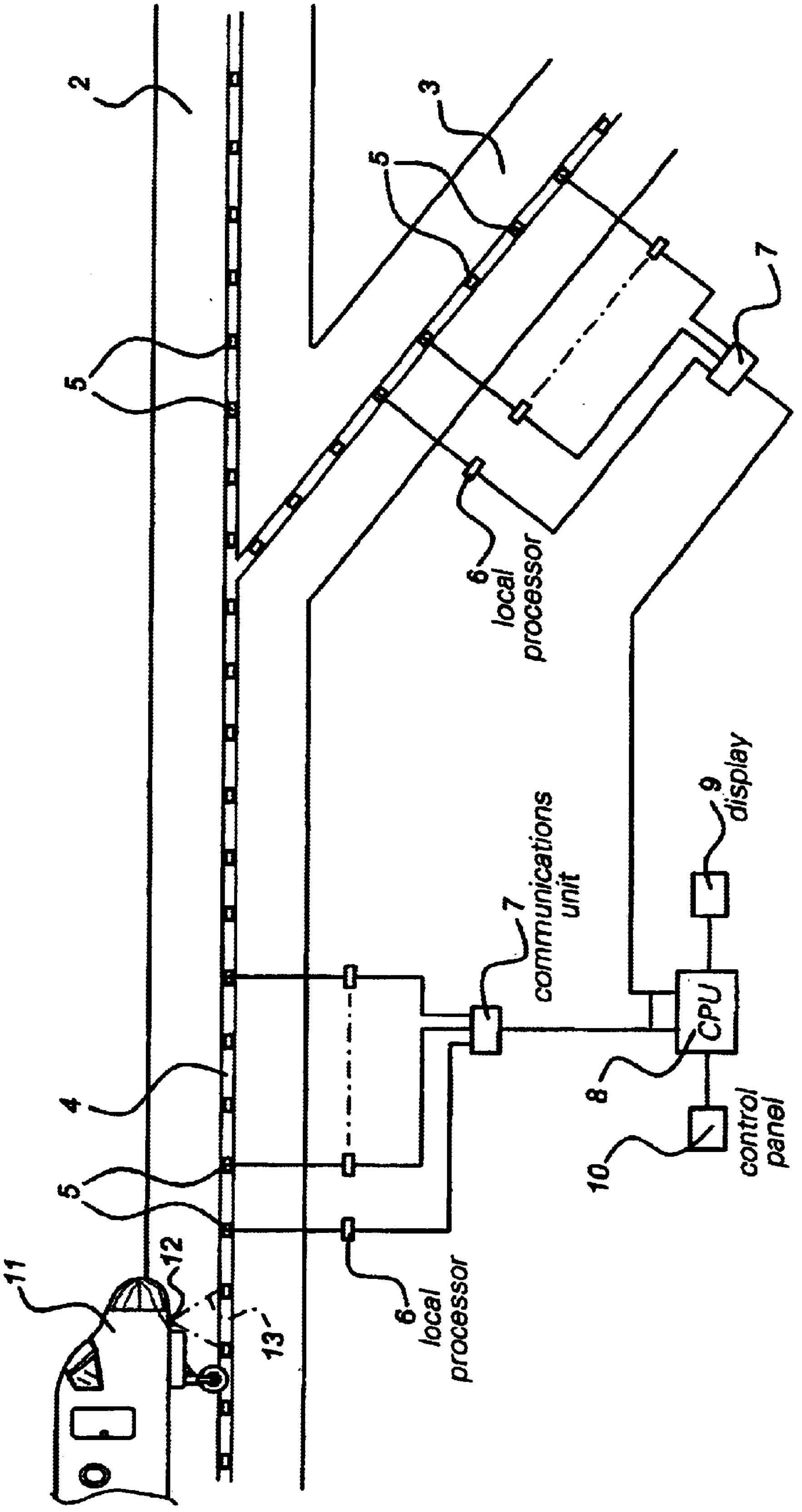
2
3
4
5
6
local processor
7
communications unit
8
CPU
9
display
10
control panel
11
12
13

SYSTEM FOR DETERMINING THE POSITION OF VEHICLES AT AN AIRPORT

BACKGROUND OF THE INVENTION

The present invention relates to a device for determining the position of a vehicle at an airport according to the preamble of claim 1. The device according to the present invention is particularly intended for defining the position of aircraft on the runway system (taxiways, take-off and landing runways and platforms) of the airport. The position of other vehicles can also be determined.

DESCRIPTION OF THE RELATED ART

European patent application EP-A-0 744 630 describes an airport surface monitoring and runway incursion warning system, in which a position of an aircraft is detected using a transmitter on board (from the transponder system) co-operating with a number of modules in radar sensor units which are disposed adjacent to a runway.

A device of this type for determining a position of a vehicle, such as an aircraft, is known and is already used at a number of airports. This known system makes use of a multilateration technique, which is based on the calculation of a position through the measurement, at various locations, of the time of reception of a signal, such as a transponder signal, transmitted by an aircraft or vehicle. In order to define a two-dimensional position, at least three receivers are required at separate locations. For the sake of operational reliability and redundancy, more than three receivers will generally be used at an airport. A transponder already available in the aircraft is generally used for position determination.

This multilateration technique has a number of disadvantages. Firstly, the signal needs to be transmitted by the aircraft whenever the aircraft is located on the ground, during manoeuvres at the airport. This requires an adaptation of the procedures currently implemented at airports and, in some cases, technical adaptation to aircraft systems. Since additional transponder signals are transmitted with the known system, there is a greater risk of interference to ground systems (such as radar) and aircraft systems (such as TCAS equipment, which serves to prevent mid-air collisions). Furthermore, the multilateration technique is sensitive to multipath interference of the transmitted signals, which may result in incorrect positions. Multipath interference is caused in particular by reflection on large (metal) objects, such as the ubiquitous airport hangars. Finally, there is the risk that, by leaving transponders switched on, 'fruiting' occurs in the receiving installations, since many aircraft are located at roughly the same distance from the receiving installations. This occurs in particular in the case of incorrectly functioning transponders, or transponders of an older type (Mode A/Mode C transponders).

Currently, the devices based on multilateration do not (yet) comply with international regulations relating to the required accuracy and availability of devices for determining the position of aircraft on airfields.

SUMMARY OF THE INVENTION

The object of the present invention is therefore to provide a device for determining a position of a vehicle, such as an aircraft, at an airport which does not reveal the aforementioned disadvantages and which can be used under all conditions, in particular under conditions of poor visibility.

This object is achieved with a device of the type defined by the technical features of claim 1.

The advantage of the device according to the present invention is that position determination of vehicles, such as aircraft, is possible at an airport, with sufficient accuracy for a traffic controller at an airport. By positioning the sensors at regular intervals, it is possible to track a vehicle, such as an aircraft. The reception characteristics of the sensors can thereby be adapted in such a way that no multipath interference occurs. According to international regulations, all (larger) aircraft are fitted with a radio altimeter, whereby the use of the device according to the present invention requires no adaptation of the aircraft or the operational procedures of the aircraft. This makes the implementation of the present device simple and cost-effective. Since the antennas of radio altimeters in aircraft are normally located on the underside of the aircraft, the extent of the area in which the radio signal is to be received will be limited. As a result, the radio signal will be received at a given moment by only one or a few of the plurality of sensors, whereby unambiguous and interference-free detection of a vehicle can take place.

In one embodiment of the present invention, the plurality of sensors are positioned in light points of runway lighting provided at the airport. The position determination of aircraft and other vehicles is referred in this embodiment to the runway lighting already provided at the airport, such as the central lighting in taxiways and the direction lighting on platforms. Making use of existing runway lighting to position the sensors offers the advantage that no additional infrastructure needs to be set up.

In a preferred embodiment of the present invention, at least one sensor of the plurality of sensors is provided with a direction-sensitive antenna. This can supply additional information which may be useful in determining the position of a vehicle, such as an aircraft, particularly if the radio signal is received at a given moment by more than one sensor. The at least one sensor is furthermore preferably provided with a signal-processing unit to process the signal detected by the at least one sensor. This makes it possible to (pre-) process the received signals in the sensor itself, thereby enabling simpler or more efficient data communication, for example via power supply lines of the light points of the runway lighting.

In one embodiment, the present device furthermore comprises a central processing device to collate, process and reproduce data originating from the plurality of sensors. The central processing device is preferably arranged to allocate an identifier to data originating from the plurality of sensors. This allocation may, for example, be based on the frequency characteristic of the at least one radio signal. These characteristics may be one or more of the following: strength, direction, frequency (furthermore all as a function of time), frequency-modulation characteristics and frequency difference in the case of an aircraft which is equipped with a plurality of radio altimeters which transmit a different signal.

The central processing device is furthermore preferably provided with warning means to generate a warning if the detected position of the vehicle is located outside a predefined area of the airport which is permitted to the vehicle. The permitted area for an aircraft may, for example, comprise a route via defined taxiways, parts of platforms and (parts of) a take-off or landing runway. Furthermore, the central processing device may be arranged to predict the further position of the vehicle and to generate a warning if, on the basis of the prediction, a possible conflict will occur between a plurality of vehicles. With the present device, the traffic controller is therefore warned if an aircraft or other vehicle is located in an unauthorised area or if a collision between aircraft and/or other vehicles is imminent.

A further aspect of the invention relates to a transmitting device for generating a radio signal, in which the radio signal can be detected by the plurality of sensors which are contained in the device according to the first aspect of the invention. This transmitting device is required, for example, so that vehicles which are not equipped with a radio altimeter or other transmitting device can be rendered detectable by means of the present device.

BRIEF DESCRIPTION OF THE DRAWINGS

The device according to the present invention will be explained in more detail below with reference to a preferred embodiment and with reference to the attached FIGURE, which is a schematic diagram showing parts of an airport and the different parts of the device according to the present invention.

DESCRIPTION OF THE PREFERRED EMBODIMENTS

The invention relates to a device which serves to determine the position and movement of individual vehicles, such as an aircraft 11, which are located in the manoeuvring area of aircraft 11 at an airport (traffic control system), such as, for example, a first and second taxiway 2, 3, which are partly shown FIG. 1. FIG. 1 furthermore shows a taxiing aircraft 11, equipped with a radio altimeter 12 which transmits a signal in a limited beam 13 which is directed towards the ground. Furthermore, the device serves to detect unauthorised location of aircraft 11 and vehicles on active take-off and landing runways, and to detect possible conflict between the aircraft themselves and between aircraft and other vehicles. The functionality of the device is enabled through analysis of signals received by special receiving equipment, said signals being transmitted by radio altimeters 12 of the type used on board aircraft 11 or by special transmitting equipment on board other vehicles.

Efficient use of an airport is determined to a large extent by the ability to identify the position of the aircraft 11 and other vehicles present at the airport as accurately as possible in all conditions. This applies in particular in conditions in which poor visibility impairs visual identification of the position of aircraft and other vehicles by a traffic controller.

FIG. 1 shows a schematic representation of the different elements in the device according to the present invention. The device comprises a plurality of sensors 5, which are located on parts accessible to the vehicle, such as an aircraft 11, at the airport, e.g. the taxiways 2, 3 shown in FIG. 1. The sensors 5 are preferably located along the centre line 4 of the taxiways 2, 3. The sensors 5 may, for example, be located in the runway lighting which, in most cases, is already provided. The beam 13 of the radio altimeter 12 of the aircraft will always be detectable during taxiing by one or more of the sensors 5, whereby the position of the aircraft 11 at the airport can be tracked.

The signals received by a sensor 5 are first processed by an associated local processor 6, which, inter alia, forwards the signals to a communications unit 7. Although, for reasons of clarity, it is indicated in the FIGURE that the local processor 6 is positioned at a distance from the sensor 5, it is preferable to position the local processor 6 as close as possible to the sensor 5, for example by integrating both the sensor 5 and the local processor 6 in the light point of the runway lighting. The communications unit 7 in turn forwards the data received from a plurality of sensors 5 via local processors 6 to a central processing unit 8, for presentation on a display screen 9.

To enable accurate determination of the position of the aircraft 11 and the specially equipped vehicle, sensors 5, which measure the strength and/or direction and/or frequency of the radio altimeter signals, are positioned at, preferably regular, intervals from one another. The position of the aircraft 11 or the specially equipped vehicle is determined with reference to one or more of these measurements. The frequencies of the individual signals received by the device, combined with a time reference which is uniform over the whole device, are used to distinguish the frequency and/or frequency-modulation characteristics of the individual radio altimeters, and also the individual aircraft or specially equipped vehicles. The specially equipped vehicles are fitted with a 'pseudo-radio altimeter' which transmits radio signals which are analogous to the radio altimeter 12, but which, unlike the present aircraft 11, differ in terms of transmitted frequency and/or frequency-modulation characteristics.

In the device according to the present invention, the sensors 5, for reception of radio altimeter signals, are preferably fitted in the centre-line lighting of the take-off, landing and taxi runways 2, 3, and also on the platform of the airport. The sensor 5 comprises a direction-sensitive antenna system which is arranged to distinguish signals according to strength, direction and frequency within the frequency band relevant to a radio altimeter 12.

In this sensor 5, a local processor 6 is furthermore preferably integrated (preprocessor) for initial analysis or processing of the received signals and for data communication. The preprocessor 6 controls a filter which transmits signals originating from the sensor 5 for the required frequency band. The strength and direction of the filtered signals are analysed for each frequency band. The preprocessor 6 records the individual strength and direction of the received signal from each of the frequency bands.

By means of data communication via the cables running along the centre-line lighting, two-way communication takes place between the local processors 6 and a communications unit 7 in a distribution station of the centre-line lighting. The communications unit 7 (intermediate processor) collects data from all connected sensors 5, including, inter alia, the identifier of the preprocessor 6 (sensor 5), the strength and direction of the received signal (divided into frequency bands) and also the time of reception of the signals concerned. The time of reception is determined using a time reference which is based on a central time reference.

From the communications unit 7 (of which there may be a plurality), two-way communication takes place with a central processing unit 8. The latter, with reference to the data regularly collected and based on an unambiguous time reference within the system, defines the position of the individual aircraft 11 and the individual vehicles at the airport which are equipped with pseudo-radio altimeters, if possible supplemented with information on the movement (direction and speed), orientation and type of the individual aircraft 11 and other vehicles. To determine the aircraft type and the orientation of the aircraft 11, if a plurality of radio altimeters are available, use is preferably made of the fixed distance, which differs for each aircraft type, between antennas of the radio altimeter of the aircraft, the fixed frequency difference between the signal transmitted by the antennas of the radio altimeters, the frequency and frequency-modulation characteristics which differ for each aircraft, and also the type-specific reflection characteristics of the aircraft in respect of the signals transmitted by the aircraft radio altimeter 12.

The identified and unidentified aircraft 11, and also the vehicles equipped with pseudo-radio altimeters, are presented on the display screen 9. When an aircraft 11 registers, the traffic controller identifies the hitherto unidentified aircraft by associating an identification feature with the aircraft 11 by means of a control panel 10, whereafter the central processing unit 8 keeps this identifier associated with the aircraft during the period of manoeuvring of the aircraft, the aircraft being located within the range of the individual sensors 5.

Vehicles located within the manoeuvring area of the aircraft at the airport are equipped with a pseudo-radio altimeter which altimeter radio signal which are analogous to the radio altimeter signal of an aircraft 11, but which differ in terms of frequency and/or frequency-modulation characteristics. The device presents aircraft 11 and vehicles differently on the display screen 9. Individual vehicles or individual types of vehicle may be equipped with pseudo-radio altimeters with different frequency and/or frequency-modulation characteristics, thereby enabling automatic identification.

Using the derived position and speed information of the aircraft 11 and other vehicles, combined with input relating to the authorised route, the device according to the invention provides the traffic controller with a warning in the event that aircraft and other vehicles are located without authorisation on active take-off and landing runways, and in the event of possible conflicts between the aircraft themselves and between aircraft and other vehicles.

In the above description, the term "processor" (local processor 6, communications unit 7 and central processing device 8), is understood to refer to a computing unit which processes data, such as a software-controlled computer, if necessary with associated digital and/or analogue circuits. A computer may be provided with a single processor, but also with a plurality of processors, possibly operating in parallel. A computer may likewise be provided with remote functionality, with data being processed at different locations separated from one another.

It will be clear to the person skilled in the art that many modifications and changes are possible in the preferred embodiment of the device according to the invention described above.

What is claimed is:

1. Device for determining the position of an aircraft at an airport, comprising a plurality of sensors for detecting at least one radio signal originating from a vehicle, the plurality of sensors (5) being positioned on parts of the airport which are accessible to the vehicle, characterised in that the at least one radio signal originates from a radio altimeter (12).

2. Device according to claim 1, in which the plurality of sensors (5) are positioned in light points of runway lighting provided at the airport.

3. Device according to claim 2, in which data communication takes place from the plurality of sensors (5) via power supply lines of the light points.

4. Device according to claim 3, in which the central processing device (8) is provided with warning means to generate a warning if the detected position of the vehicle (11) is outside a predefined area at the airport which is permitted to the vehicle (11).

5. Device according to claim 4, in which the central processing device (8) is arranged to predict the future position of the vehicle (11) and to generate a warning if, on the basis of the prediction, a possible conflict will occur between a plurality of vehicles (11).

6. Device according to claim 1, in which at least one sensor of the plurality of sensors (5) is provided with a direction-sensitive antenna.

7. Device according to claim 1, in which at least one sensor of the plurality of sensors (5) is provided with a signal-processing unit to process the signal detected by the at least one sensor.

8. Device according to claim 1, in which the device furthermore comprises a central processing device (8) to collect, process and present data originating from the plurality of sensors (5).

9. Device according to claim 8, in which the central processing device (8) is arranged to allocate an identifier to data originating from the plurality of sensors (5).

10. Device according to claim 9, in which the identifier is allocated on the basis of a frequency characteristic of the at least one radio signal.

11. Transmitting device for generating a radio signal, in which the radio signal can be detected by the plurality of sensors (5) which are included in the device according to claim 1.

12. Device for determining a position of an aircraft at an airport working in conjunction with a radio altimeter installed in the aircraft, comprising:

a plurality of sensors located at regular intervals along a center line of airport taxiways and configured to receive a downwardly directed signal from the altimeter;

plural local processors, each local processor connected to process signals received by a corresponding sensors;

plural communications units connected to receive signals from the local processors; and a central processing unit connected to receive signals from the communication units, the position of the aircraft being determined by the central processing unit with reference to a measurement using signals from at least one sensor.

13. The device of claim 12, wherein each sensor comprises a runway running light.

14. The device of claim 12, wherein the sensors and local processors are an integrated unit.

15. The device of claim 12, wherein the central processing unit comprises a display screen and a local control panel.

16. The device of claim 12, wherein the sensors comprise a direction-sensitive antenna system arranged to distinguish signals according to strength, direction and frequency within a frequency band of the radio altimeter.

17. The device of claim 16, wherein, the sensors are integrated with the local processor for analysis of received signals and for data communication, the local processor comprise a filter for filtering signals originating from the sensor so that a strength and a direction of filtered signals are analysed for plural frequency bands, and the local processor determines the individual strength and direction of the received signal from each of the frequency bands.

18. Device for determining the position of a vehicle at an airport, comprising:

a plurality of sensors for detecting at least one radio signal originating from a downwardly directed radio altimeter within the vehicle, the plurality of sensors being upwardly positioned on parts of the airport accessible to the vehicle to receive a downwardly directed signal the radio altimeter.

19. Device according to claim 18, in which at least one sensor of the plurality of sensors is provided with a direction-sensitive antenna.

20. Device according to claim 18, in which at least one sensor of the plurality of sensors is provided with a signal-processing unit to process the signal detected by the at least one sensor.

* * * * *